United States Patent [19]

Byers et al.

[11] Patent Number: 5,032,984
[45] Date of Patent: Jul. 16, 1991

[54] DATA BANK PRIORITY SYSTEM

[75] Inventors: Larry L. Byers, Apple Valley; Howard A. Koehler, Minneapolis; Wayne A. Michaelson, Circle Pines, all of Minn.

[73] Assignee: Unisys Corporation, Blue Bell, Pa.

[21] Appl. No.: 246,509

[22] Filed: Sep. 19, 1988

[51] Int. Cl.$^5$ .............................................. G06F 13/18
[52] U.S. Cl. .................... 364/200; 364/242.6; 364/242.7; 364/242.91
[58] Field of Search ... 364/200 MS File, 900 MS File, 364/200, 900

[56] References Cited

U.S. PATENT DOCUMENTS

| | | | |
|---|---|---|---|
| 3,353,160 | 11/1967 | Lindquist | 364/200 |
| 3,399,384 | 8/1968 | Crockett et al. | 364/200 |
| 3,425,037 | 1/1969 | Patterson et al. | 364/200 |
| 3,434,111 | 3/1969 | Schmidt et al. | 364/200 |
| 3,473,155 | 10/1969 | Couleur et al. | 364/200 |
| 3,534,339 | 10/1970 | Rosenblatt | 364/200 |
| 3,573,856 | 4/1971 | Best et al. | 364/200 |
| 3,629,854 | 12/1971 | Hauck | 364/200 |
| 3,643,229 | 2/1972 | Stuebe et al. | 364/200 |
| 3,676,860 | 7/1972 | Collier et al. | 364/200 |
| 3,710,351 | 1/1973 | Nakamura | 364/200 |
| 3,742,148 | 6/1973 | Ledeen et al. | 370/85.6 |
| 3,752,932 | 8/1973 | Frisone | 370/85.8 |
| 3,832,692 | 8/1974 | Henzel et al. | 364/200 |
| 4,652,993 | 3/1987 | Scheuneman et al. | 364/200 |
| 4,745,548 | 5/1988 | Blahut | 364/200 |
| 4,760,515 | 7/1988 | Malmquist et al. | 364/200 |

Primary Examiner—Gareth D. Shaw
Assistant Examiner—P. V. Kulik
Attorney, Agent, or Firm—Frederick W. Niebuhr; Glenn W. Bowen; Mark T. Starr

[57] ABSTRACT

A system for apportioning serially supplied data among eight contending memory banks tends to equalize usage among the banks despite their arrangement in a predetermined, sequential priority. Each bank has a data hold register, an OR logic gate to generate a request signal whenever its register contains data, and a negative AND gate for enabling the bank for clearing data from its register. All except the lowest priority bank further include a blocking latch and an enabling NOR gate. Each blocking latch is set when its associated bank is enabled, and then inhibits its associated AND gate and each higher priority AND gate, while enabling each lower priority NOR gate. Each enabled NOR gate provides an enabling signal to all lower priority AND gates. When the lowest priority AND gate is enabled by the NOR gates and its request signal, all blocking latches are cleared. The banks thus are utilized in a sequence that is maintained even if one or more banks are bypassed on occasion.

14 Claims, 4 Drawing Sheets

– 1 –

DATA BANK PRIORITY SYSTEM

BACKGROUND OF THE INVENTION

This invention relates to systems for processing data, and more particularly to a means for apportioning data from common sources among a plurality of memory banks contending for the data.

It is a known technique in data processing to provide a configuration involving a plurality of memory banks or other destinations connected in common to one or more sources of data. Typically, incoming data is provided serially to a parallel arrangement of such destinations, whereby in combination they are capable of processing or transferring data at a rate commensurate with the serial data supply rate.

Such systems require means for apportioning incoming data among the contending destinations. One approach involves assigning individual, sequential priority to the destinations. For example, U.S. Pat. No. 3,534,339 (Rosenblatt) discloses a system which encodes identification bits of multiple active devices simultaneously, and selects the identification bits corresponding to a request signal from the highest priority device. Similarly, in U.S. Pat. No. 3,425,037 (Patterson), signals from all peripheral devices sharing a common connection are monitored, with a request signal from each inhibited if the monitoring means senses a higher priority request. Other direct sequential priority systems are disclosed in U.S. Pat. No. 4,745,548 (Blahut) and U.S. Pat. No. 3,353,160 (Lindquist).

Alternatively, priority can be determined by sensing the priority of less than all contending destinations. For example, U.S. Pat. No. 3,832,692 (Henzel) discloses a plurality of priority seeking devices sharing a common bus. Each device "looks back" in the sense of determining the priority indications of two or more previous, higher priority devices. Thus, access is permitted only if the previous two or more devices are not requesting access.

The aforementioned sequential systems, when employed in connection with competing destinations, tend to supply the majority of data to the highest priority destinations at the expense of the lowest priority destinations. This problem can be reduced by limiting the number of separate destinations sharing the common source of data, or by employing additional circuitry or logic to counter the effect of the unequal priorities. For example, U.S. Pat. No. 3,676,860 (Collier) discloses a system in which competing processors each have a request phase and a control phase, with a priority system determining which among several processors can move from the request to the control phase. A register which determines priorities is modified each time a connection is established by one of the processors. In U.S. Pat. No. 3,399,384 (Crockett), each of a plurality of peripheral devices can issue demand signals of differing priorities. Consequently, final priority is determined by the level of the request, and also by a pre-assigned priority among the peripheral devices.

Another approach to countering the unequal priorities is shown in U.S. Pat. No. 4,760,515 (Malmquist). A plurality of arbiters are assigned a sequential priority, with each arbiter enabled to access a shared bus if no access requests are received from higher priority arbiters. A command rotor is provided to determine priority among plural requests simultaneously reaching the same arbiter. In U.S. Pat. No. 3,742,148 (Ledeen), sequentially arranged stations are connected to a common terminal, with each station having control circuitry interconnected with at least two other stations. In particular, control circuitry of a given station is connected to the next succeeding and to the next preceding stations. When conditioned to transmit, or when disabled by the next preceding station, the given station disables the succeeding station. The given station also can be disabled by the next succeeding station, in which case the control circuitry also disables the next preceding station.

To the extent that certain of these approaches tend to equalize the usage of the contending data destinations, they either tend to be overly complex, or fail to achieve a satisfactory degree of equality.

Therefore, it is an object of the present invention to improve the rate at which memory banks can be initiated for receiving serial data, while providing substantially equal usage of all banks.

Another object of the invention is to improve memory performance by issuing a bank request at the clock cycle rate, eliminating lost clock cycles between bank requests.

Another object is to initiate a bank function at a designated clock cycle rate, even if certain bank requests in a predetermined priority scheme are bypassed.

Yet another object is to increase the speed of operation of memory bank priority logic, by eliminating conventional scanning techniques which waste clock cycles on bank rotation regardless of the request status of the banks.

SUMMARY OF THE INVENTION

To achieve these and other objects, there is provided a data handling system including a plurality of memory banks. Each bank includes a data hold register for receiving the data, and means for generating a first request signal when its associated register is clear, and a second request signal when its associated register contains data. The banks contend for data from common sources in accordance with a predetermined priority scheme wherein each of the memory banks has a different priority. The system includes apparatus for apportioning the clearing of data from among all of the banks.

The apparatus includes a plurality of triggering means, each associated with one of the memory banks. Each triggering means, when enabled, enables clearing a data bit from the register of its associated bank. A plurality of control signal generating means are provided, one associated with each of the banks, for alternatively enabling and disabling its associated triggering means. Each of the control signal generating means includes a blocking means for providing a blocking signal responsive to the enabling of its associated triggering means, and further includes an enable signal generating means configured to receive the following signals as enabling inputs: the blocking signals of its associated bank and of all banks having a lower priority (equal and lower priority blocking signals) and its associated one of the first request signals. The enable signal generating means then generates an enable signal when receiving at least one of these signals.

The associated triggering means is configured to receive the following signals as trigger inputs: the equal and lower priority blocking signals; the enable signal from the enable signal generating means of all of the banks having a higher priority (higher priority enable signals); and the associated second request signal.

The associated triggering means is enabled, thereby to enable its associated memory bank for clearance of data from the associated hold register, responsive to receiving the higher priority enable signals and the associated second request signal while not receiving any of the equal and lower priority blocking signals.

Preferably, each of the aforementioned signals is present in the form of a selected one of alternative first and second states of a binary logic signal. The triggering means preferably includes a negative AND logic gate and an active latch receiving the output of the AND gate. A plurality of input channels to the AND gate are provided for receiving the high priority enable signals which are low, the equal and lower priority blocking signals which are high, and the request signal, which is high in the first state and low in the second state. The AND gate sets the active latch responsive to its receiving the higher priority enable signals and associated second request signal, while not receiving any of the equal and lower priority blocking signals, i.e. all inputs are low.

The blocking or indicator means can comprise a blocking latch, which receives the output of the associated active latch and thus becomes set whenever the active latch is set. A preferred enable signal generating means is a NOR logic gate, having input channels for receiving the equal and lower priority blocking signals and the first request signal. Each NOR gate provides its output to all of the AND logic gates of memory banks having a lower priority.

In spite of the predetermined priority among banks, the present system avoids over-utilizing higher priority banks. By virtue of the blocking signals provided to its AND logic gate, each bank is able to "look ahead" to receive an indication that the active and blocking latches of subsequent, lower priority banks are clear (not set), with higher priority, previously utilized banks prevented from accepting further data until their associated blocking latches are cleared. Accordingly, the banks collectively perform at a rapid rate as determined by the clock cycle, eliminating lost clock cycles between bank requests.

IN THE DRAWINGS

For a further appreciation of the above and other features and advantages, reference is made to the following detailed description and drawings, in which.

DETAILED DESCRIPTION OF THE PREFERRED EMBODIMENT

Figure 1:
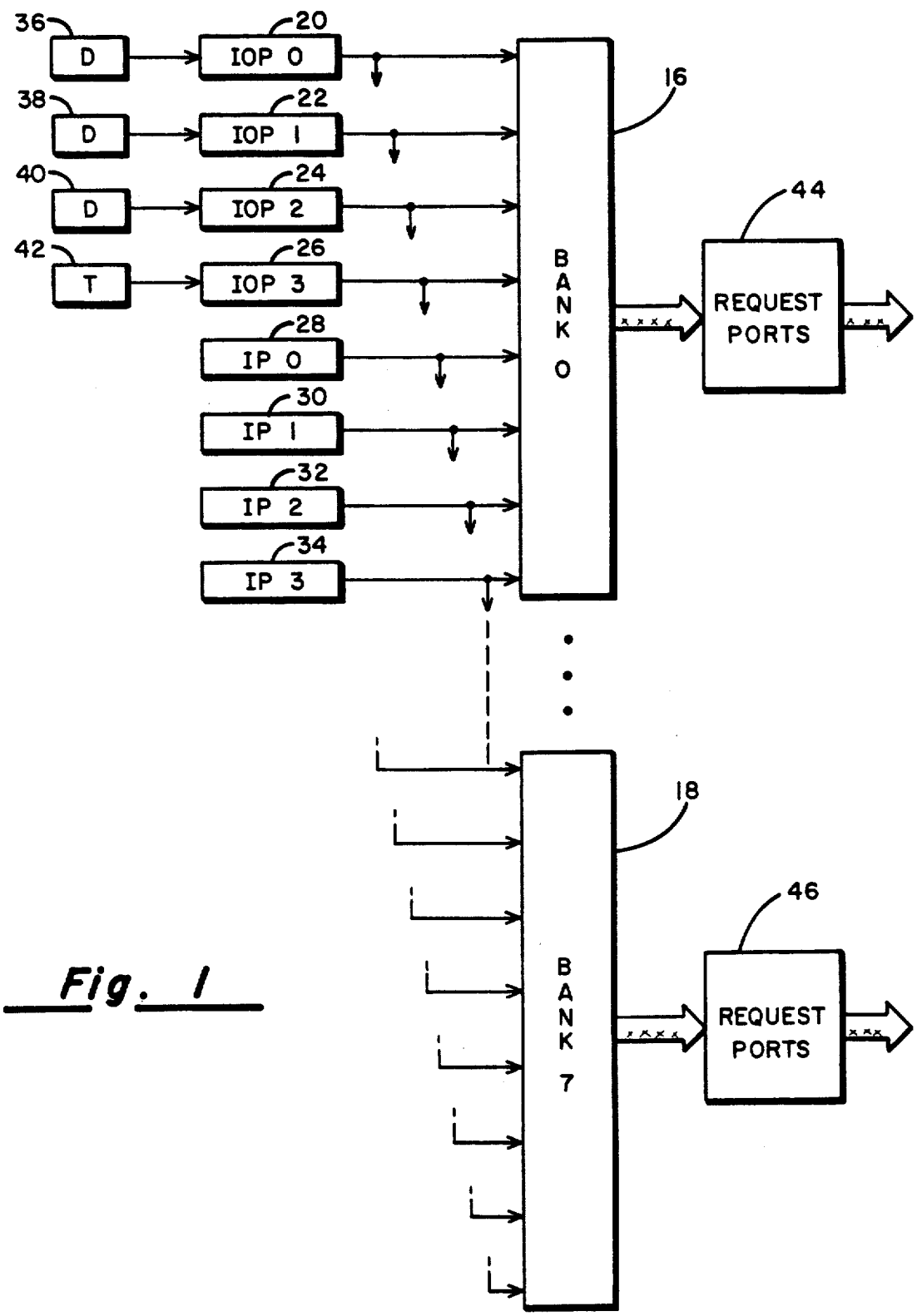
FIG. 1 is a schematic representation of a data handling system with a memory having a plurality of memory banks contending for data from common sources.

Turning now to the drawings, there is shown in FIG. 1 part of a data handling system including a central processing unit (CPU) or instruction processor having a plurality of memory banks including a bank designated "0" shown at 16, a memory bank designated "7" at 18. Similar intermediate banks are not shown, but all of the banks interact with one another. It is to be appreciated that a number of banks other than eight could be employed. Each memory bank receives data from a plurality of input/output processors 20-26 labeled IOP0, IOP1, IOP2 and IOP3, as well as from a plurality of other instruction processors 28-34 designated IP0, IP1, IP2 and IP3. Each of the input/output processors is connected with a peripheral storage device outside of the CPU. In particular, disc drives 36, 38 and 40 provide data to processors IOP0, IOP1 and IOP2, respectively. Processor 26 receives data from a tape drive 42. The additional instruction processors 28-34 are provided for executing commands or subroutines in the course of performing various operations on data from the tape drive or one of the disc drives.

Thus, it is seen that a portion of bank 16 (i.e. bank 0) must provide a common data bus or channel to receive the output of the instruction processors and transfer data to request ports at 44; and likewise, to ports 46 in connection with memory bank 18. The outputs for request ports 44 and 46 indicate a return path for data, either to one of the instruction processors 28-34 or through one of input/output processors 20-26 to its associated one of the disc drives or tape drives.

As indicated schematically by the downwardly pointing arrows in connection with processors 20-34, each of the processors can provide its output to any one of the memory banks. In this sense, these processors comprise common sources of data for the banks, and it is thus necessary to apportion, among all memory banks, incoming data from these sources.

Figure 2:
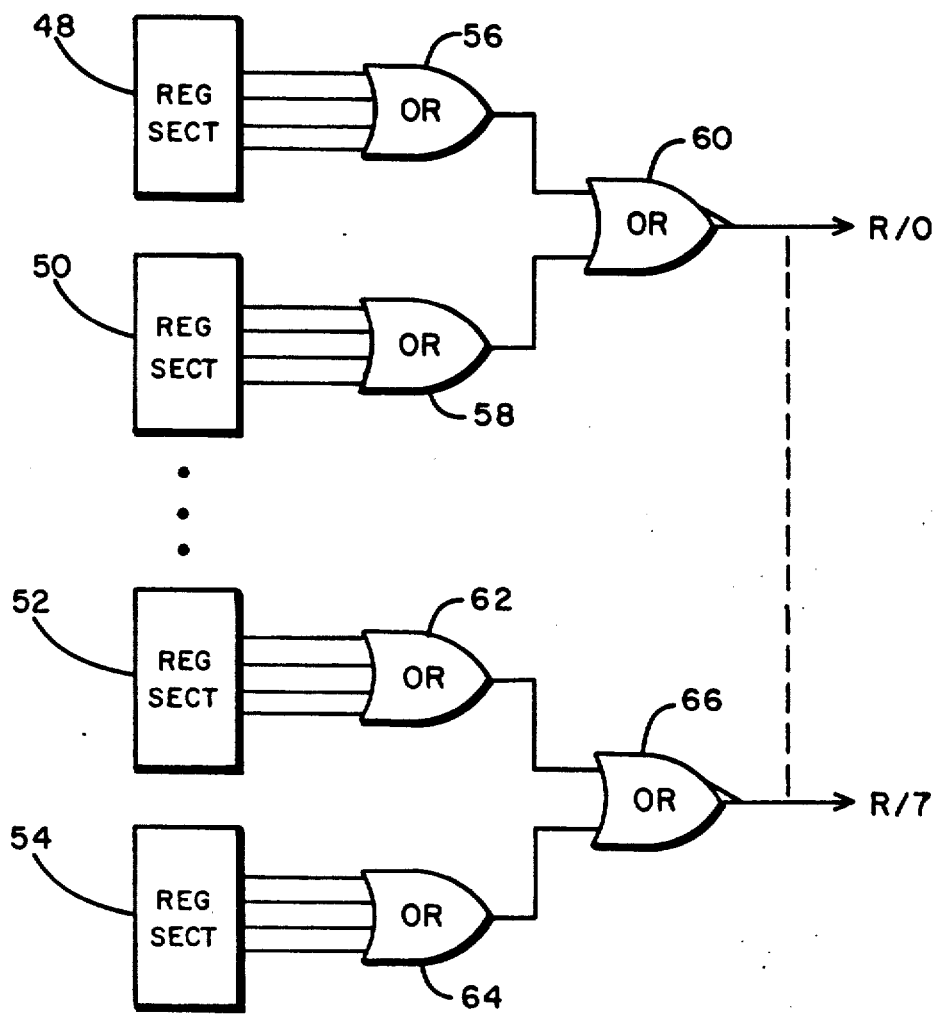
FIG. 2 is a more detailed schematic representation of data hold registers of the memory banks, along with means for indicating the presence of data in the registers.

As seen in FIG. 2, each of the banks includes a hold register dividing into first and second priority sectors, for example register sectors 48 and 50 in connection with bank 16 and register sectors 52 and 54 in connection with bank 18. First priority register sectors 48 and 52 process data from higher priority sources such as the input/output processors, while register sectors 50 and 54 handle lower priority data from the instruction processors 28-34. For further information on the means for accomplishing this priority scheme, reference is made to U.S. Pat. No. 4,926,313 (Byers et al).

Returning to FIG. 2, an OR gate 56 receives the output of each of four hold latches in register sector 48, and generates a high logic state as its output if any of these latches contains data. An OR gate 5 is similarly connected to the latches in register sector 50. The output of OR gates 56 and 58 is provided to an OR gate 60, the output of which is inverted to provide a request signal, here identified as R/0, corresponding to the highest priority bank.

In a similar manner, OR gates 62, 64 and 66 are associated with register sectors 52 and 54, thus to provide a signal designated R/7. Each request signal is low if any of its associated latches contains data, to provide an enabling signal for its associated bank to clear one of the latches in the hold register (provided that certain other enabling signals are also present). With its associated hold register cleared, however, the request signal goes high, to provide a signal for disabling its associated memory bank from receiving further data from the common sources.

Figure 3:
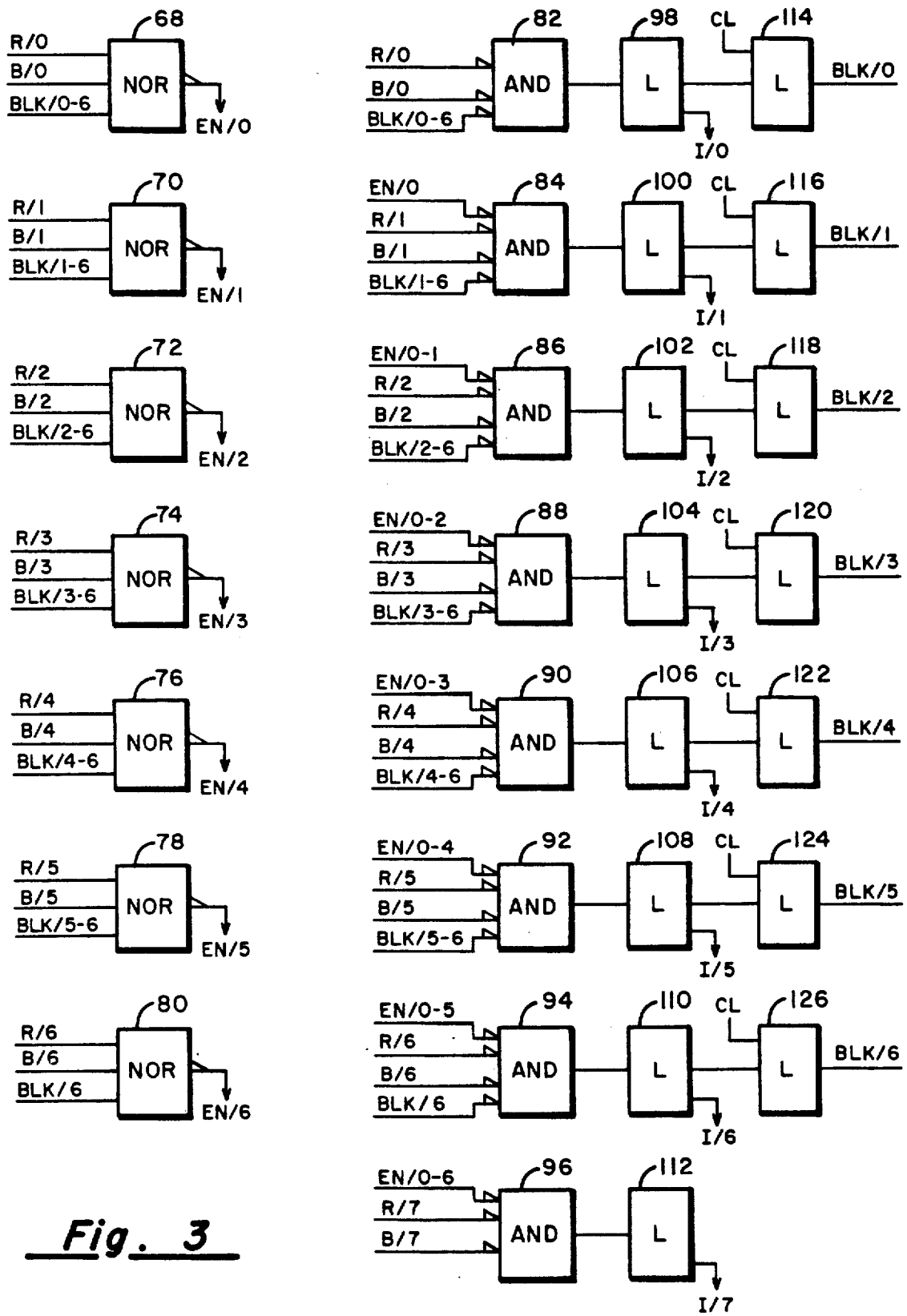
FIG. 3 is a schematic representation of a system for apportioning data among eight memory banks in accordance with the present invention.

FIG. 3 shows an interconnection among the eight memory banks which determines how incoming data is apportioned among the banks. Each of the banks includes a negative AND logic gate which provides its output to an active request latch. Bank 0 through bank 6, i.e. all except the lowest priority bank, further include an OR logic gate providing an input to the AND logic gate of all lower priority banks, and a blocking latch which receives the output of its associated active request latch. Thus, the apportioning system as a whole includes NOR gates 68-80, negative AND gates 82-96, active request latches 98-112 and blocking latches 114-126. Signals R/0 through R/7 are the request signals generated according to the hold register content, as noted in connection with FIG. 2. Each of signals B/0 through B/7 is an active signal generated responsive to the initiation of its associated bank to receive data, and has a sufficient duration, for example six clock pulses, to disable its associated bank from re-initiating a data request in an undesirably short time after a previous initiation.

Briefly, the components of the various banks are interconnected as follows. Each of NOR gates 68-80 receives three kinds of input: the signal R/n associated with its bank; input B/n associated with the bank; and the output of all of blocking latches 114-126 of equal or lower priority.

Each of AND gates 82-96 receives the following types of input: the associated request signal R/n; the associated active signal B/n; the output of each of blocking latches 114-126 having an equal or lower priority; and the output of each of NOR gates 68-80 having a higher priority.

Lowest priority memory bank 7 includes no NOR gate, and further includes no blocking latch. Rather, the setting of active latch 112 causes the latch to generate an I/7 clearing signal, which will clear all of the blocking latches of the memory banks.

Figure 4:
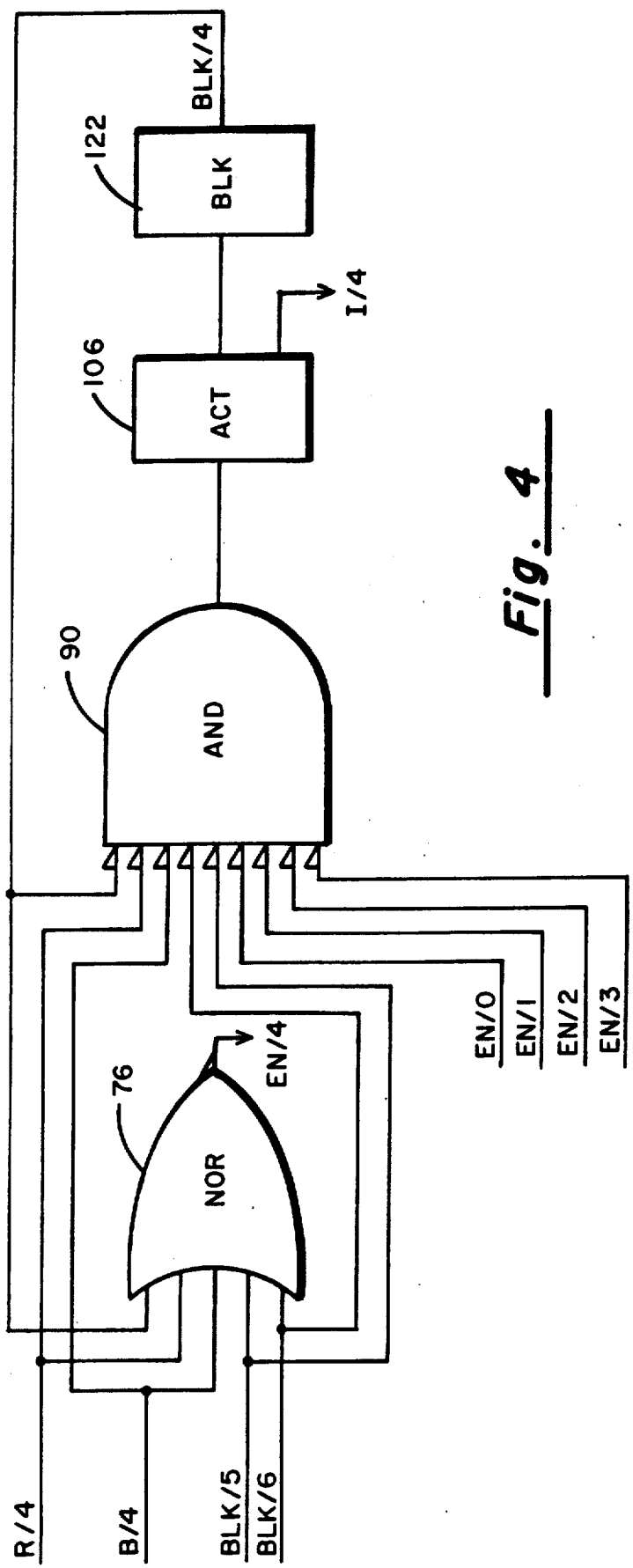
FIG. 4 is a more detailed representation of the initiation control means of one of the banks.

FIG. 4 illustrates the system in more detail, with reference to memory bank 4. The output of blocking latch 122 is provided to NOR gate 76, and provided to AND gate 90. Similarly, blocking latch output signals BLK/5 and BLK/6 are provided to NOR gate 76 and to AND gate 90. Enabling signals En/0 through En/3 from NOR gates 68-74 are provided to AND gate 90. Finally, request signal R/4 and active signal B/4 are provided to NOR gate 76 and to AND gate 90. When all signals provided to AND gate 90 are low, AND gate 90 sets active request latch 106, which sets blocking latch 122 and generates an "initiate" signal I. Signal I represents a request for data from the sources to the appropriate bank, in this case bank 4, and is used in the divided latch priority system discussed in the aforementioned U.S. Pat. No. 7,926,313.

Figure 5:
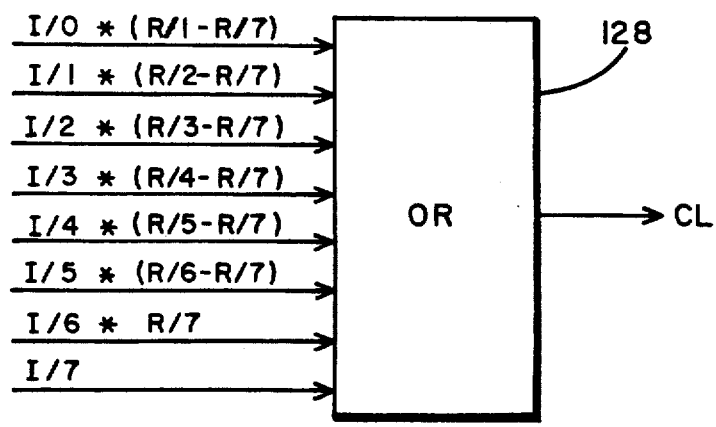
FIG. 5 schematically illustrates a means for re-initiating a cycle through the memory banks upon initiation of the lowest priority memory bank.

FIG. 5 discloses the means for clearing blocking latches 114-126 in greater detail. In FIG. 5, the symbol I/O*(R/1-R/7) signifies the logical AND of I/O with the logical OR of R/1 through R/7. The symbols on the remaining input lines to OR gate 128 have a similar meaning. An OR gate 128 provides the clearing signal to the blocking latches in accordance with any of eight conditions. One of these conditions, namely that the output of active request latch 112 is high, is shown in FIG. 3. The remaining inputs to OR gate 128 relate to each of remaining active request latches, in particular inputs that satisfy the condition that a given active request latch set, and all of the lower priority hold register latches are cleared.

The system operates as follows, beginning with the condition of all of blocking latches 114-126 being clear, and the hold registers of all of the memory banks clear for receiving data. Request signals R/0 through R/7 are high, and active signals B/0 through B/7 are in the low logic state. Also low are signals BLK/0 through BLK/6, the outputs of the blocking latches. Pursuant to the aforementioned priority scheme, processor requests are issued to various banks. Assume that a request issues to each of the banks, so that the hold registers of all banks now contain data. Request signals R/0 through R/7 low. Consequently, AND gate 82 is conditioned to set active request latch 98, whereupon latch 98 generates the bank initiation signal I/0 and sets blocking latch 114. Blocking signal BLK/0 thus becomes high, enabling NOR gate 68 and inhibiting AND gate 82. The active signal B/0 is shifted to the high logic level, and the highest priority latch of register sectors 48 and 50 of memory bank 16 is cleared. Further data is not cleared from bank 16 (bank 0) at this point, as AND gate 82 remains disabled.

Bank 1, however, becomes conditioned for initiation and clearing priority, because the shift of any one of R/0, B/0 or BLK/0 to the high level is sufficient to enable NOR gate 68, thus providing the NOR gate output signal En/0 at a low logic level to AND gate 84. Due to the presence of data in bank 1, signal R/1 is low, and signal B/1 is low. The outputs of blocking latch 116 and all lower priority blocking latches, i.e. blocking latches 118-126, are low, since these latches remain clear. All of these inputs are provided to AND gate 84, and thus condition this AND gate to set active request latch 100. Latch 100 then generates initiation signal I/1 and sets blocking latch 116. As soon as this blocking latch is set, NOR gate 70 is enabled and AND gate 84 is inhibited, which for the moment prevents bank 1 from being cleared of further data.

Assuming all of the remaining banks have data, the sequence of operation will proceed as described, until AND gate 96 of bank 7 is enabled, thereby to set active request latch 112, to generate the initiation signal I/7 and the clearing signal which clears all of the blocking latches, thus to condition all banks for clearance of further data.

Should one of the memory banks in the sequence not be conditioned for clearing of data, such bank can be bypassed and the sequence continues as described. For example, suppose in the above sequence that bank 2 does not have data in its hold register and causes a resultant signal R/2 at the high logic level. This of course inhibits AND gate 86 from setting active request latch 102, and consequently blocking latch 118 is not set. Further, the fact that blocking latches 114 and 116 remain set continues to inhibit higher priority AND gates 82 and 84.

In this case, the system "looks ahead" to lower priority AND gates 88 through 96. Assuming the hold register of bank 3 contains data, signals R/3 and B/3 are low. Blocking latches 120 through 126 remain clear. Further, as signal R/2 is high, the output of NOR gate 72 (signal En/2) is low. These signals are supplied to AND gate 88, and all are low, so that AND gate 88 is conditioned to set its associated request pending latch.

Likewise, it is to be appreciated that the logic permits bypassing of two or more consecutive memory banks.

In particular, assuming memory banks 2 and 3 had been bypassed due to the absence of data in their hold registers, signals R/2 and R/3 would both be at the high logic level, permitting NOR gates 72 and 74 to provide the necessary input to enable AND gate 90 of bank 4.

Thus, in spite of the predetermined sequential priority from bank 0 through bank 7, the system in accordance with the present invention results in substantially equal usage among these memory banks. One or more banks in the predetermined sequence can be bypassed without wasting clock cycles, due to the virtually instantaneous conditioning of the next lower priority bank following the bypassed banks. Thus, performance of the memory is improved b y virtue of increased speed and equal usage among individual memory banks.

What is claimed is:

1. In a data handling system including a plurality of memory banks, each bank including an associated data hold register for receiving data and an associated means for generating a request signal having a first state when its associated data hold register is clear and a second state when its associated data hold register contains data, and wherein said banks content for data from common sources in accordance with a predetermined priority scheme in which each of said memory banks has a different priority; apparatus for apportioning the clearing of data from among all of said banks, including:

a plurality of triggering means, each triggering means associated with one of said memory banks;

a plurality of control signal generating means, each associated with one of said banks, for alternatively enabling and disabling said triggering means, each associated control signal generating means including:

(a) an associated blocking means for providing a blocking signal responsive to the enabling of its associated triggering means; and (b) an associated enable signal generating means configured to receive a plurality of enabling means inputs including (i) selected blocking signals consisting of the blocking signals of the associated bank and of each of said banks having a lower priority, and (ii) the associated request signal in said first state, said associated enable signal generating means generating an enabling signal when receiving at least one of said enabling means inputs;

said associated triggering means being configured to receive said selected blocking signals, selected enabling signals consisting of the enabling signals from the enable signal generating means of all banks having a higher priority than the associated bank, and the associated request signal; and wherein said associated triggering means is enabled, to thereby enable its associated memory bank for clearance of data from the associated data hold register, responsive to receiving said selected enabling signals and said associated request signal in said second state, while not receiving any of said select blocking signals.

2. The apparatus of claim 1 wherein:

each of said enable signals and said blocking signals, and each of said first and second request signals, is a selected one of alternative high and low logic states of a binary logic signal.

3. The data handling system of claim 2 wherein:

each said triggering means includes a negative AND logic gate and an active latch receiving the output of said AND gate, said AND gate having as inputs said selected enabling signals, said selected blocking signals and said associated request signals, said AND gate being conditioned to set said active latch responsive to receiving said selected enabling signals and associated second request signal in the low logic state while receiving inputs corresponding to said selected blocking signals in the low logic state.

4. The system of claim 3 wherein:

said blocking means comprises a blocking latch which receives an output of its associated one of said active latches and is set whenever its associated active latch is set.

5. The system of claim 2 wherein:

each of said enable signal generating means comprises a NOR logic gate, having as inputs said selected blocking signals and said second request signal, and providing its enabling signal to each of the AND logic gates of each of said banks having a lower priority than said associated bank.

6. The system of claim 3 wherein:

said blocking means comprises a blocking latch which receives the output of its associated one of said active latches and is set whenever its associated active latch is set.

7. The system of claim 4 wherein:

each of said enable signal generating means comprises a NOR logic gate, having as inputs said selected blocking signals and said second request signal, and providing its enabling signal to each of the AND logic gates of each of said banks having a lower priority than said associated bank.

8. The system of claim 6 further including:

a latch clearing means for clearing all of said blocking latches responsive to the conditioning of a one of said AND gates associated with a lowest priority bank of said banks.

9. The system of claim 8 wherein:

said clearing means further clears said blocking latches responsive to said conditioning of any designated one of said AND gates of said banks when the data hold register of each one of the banks having a priority lower than that of the bank associated with said designated AND gate, is clear of data.

10. A data handling system including:

a source of serial data, and a plurality of memory banks contending for data from the source according to a predetermined priority scheme in which one of said banks is a lowest priority bank and the remaining banks have different priorities, each bank including an associated data hold register and means for generating an associated binary request signal at a first logic level whenever the associated hold register is clear of data, and at a second logic level when the associated hold register contains data;

a plurality of triggering means, one associated with each of said banks;

a plurality of control signal generating means, one associated with each of said remaining banks, for alternatively enabling and inhibiting said triggering means, each associated control signal generating means including:

(a) an associated means for providing a binary logic blocking signal at said first logic level responsive to the enabling of its associated triggering means; and (b) an associated enabling signal generating means receiving a plurality of inputs including (i) selected blocking signals consisting of the blocking signals of the associated bank and of each of said remaining banks having a lower priority than the associated bank, and (ii) the associated request signal, said associated enabling signal generating means generating an enabling signal at said second logic level whenever at least one of said selected blocking signals is at said first logic level or said associated request signal is at said first logic level;

said associated triggering means receiving as inputs said selected blocking signals, selecting enabling signals consisting of the enabling signals associated with each of said banks having a higher priority than said associated bank, and said associated request signal; and wherein said associated triggering means is enabled, to thereby enable its associated bank for clearing of data from said associated data hold register, responsive to all of said selected enabling signals, said selected blocking signals, and said associated request signal being at said second logic level.

11. The data handling system of claim 10 further including:

an active generating means associated with each of said triggering means for generating a bank active signal at said first logic level responsive to the enabling of its associated triggering means, and for providing said bank active signal to its associated one of said enabling signal generating means, and to said associated triggering means.

12. The data handling system of claim 11 wherein:

each of said bank active signals has a duration limited to a predetermined period of time.

13. A process for apportioning serially received data among a plurality of memory banks contending for the data according to a predetermined priority in which one of the banks is designated as a lowest priority bank and the remaining banks have different priorities, and wherein each bank includes an associated data hold register, and an associated triggering means for enabling its associated bank to receive said data; the process including the steps of:

generating a binary request signal associated with each bank, at a first level whenever the associated hold register is clear of data and at a second level whenever the associated register contains data;

generating a binary blocking signal associated with each bank and at said first level responsive to an enabling of the associated triggering means;

generating an enabling signal associated with each bank, with said associated enabling signal having said second logic level whenever at least one of a plurality of enabling inputs is at said first logic level, wherein said enabling inputs include (i) selected blocking signals consisting of the blocking signals of the associated bank and of each of said remaining banks having a lower priority, and ( ii) the associated request signals; and enabling said associated triggering means to thereby enable its associated bank for clearing data from said associated register, based on a plurality of triggering inputs including (i) said selected blocking signals, (ii) selected enabling signals consisting of the enabling signals associated with each of said banks having a higher priority than the associated bank, and (iii) said associated request signal, whenever said selected enabling signals, said selected blocking signals, and said associated request signal are at said second logic level.

14. The process of claim 13 further including:

setting all of said blocking signals at said second logic level responsive to enabling the triggering means associated with said lowest priority bank.

* * * * *